United States Patent [19]

Juso et al.

[11] Patent Number: 5,731,058
[45] Date of Patent: Mar. 24, 1998

[54] LABEL ADHESION SYSTEM

[75] Inventors: Hiromi Juso, Gose; Katsuyuki Konishi, Kashihara; Shoji Maekawa, Shiki-gun, all of Japan

[73] Assignee: Sharp Kabushiki Kaisha, Osaka, Japan

[21] Appl. No.: 867,383

[22] Filed: Jun. 2, 1997

Related U.S. Application Data

[63] Continuation of Ser. No. 452,689, May 30, 1995, abandoned.

[30] Foreign Application Priority Data

Jan. 31, 1995 [JP] Japan ................................. 7-013773

[51] Int. Cl.⁶ ............................................. C09J 7/02
[52] U.S. Cl. .................... 423/156; 428/157; 428/343; 428/354
[58] Field of Search ................................. 428/343, 354, 428/156, 157

[56] References Cited

U.S. PATENT DOCUMENTS 2,721,810  10/1955  Schram.

FOREIGN PATENT DOCUMENTS

0383330 A3  8/1990  European Pat. Off..
3805223 A1  8/1989  Germany.
4237252 A1  5/1994  Germany.

*Primary Examiner*—Jenna Davis
*Attorney, Agent, or Firm*—Nixon & Vanderhye P.C.

[57] ABSTRACT

A label adhesion system, in which an adhesive label is adhered on an adhesive face of an article are disclosed in which label peeling is not generated in normal use and adhesive remainders can be prevented where re-adhering. In the above label adhesion system in which the first adhesion region having strong adhesiveness is provided in at least a portion of a peripheral part within the adhesion face described above, and the second adhesion region excluding the first adhesive region is set to have weaker adhesiveness than that of the first adhesion region.

14 Claims, 8 Drawing Sheets

LABEL ADHESION SYSTEM

This is a continuation of application Ser. No. 08/452,689, filed May 30, 1995, now abandoned.

FIELD OF THE INVENTION

The present invention relates to a label adhesion system in which adhesive labels capable of re-adhesion are adhered to the surfaces of articles such as sound and image recording medium cases, other information recording medium cases, stationery and tags.

BACKGROUND OF THE INVENTION

A region for sticking a label for showing recorded content is provided on a recording medium such as cassette tapes, video tapes, magneto-optical disk cartridges and optical disk cartridges. In many cases, labels are peeled off again for rewriting, and other fresh labels are adhered thereto.

Figure 12:
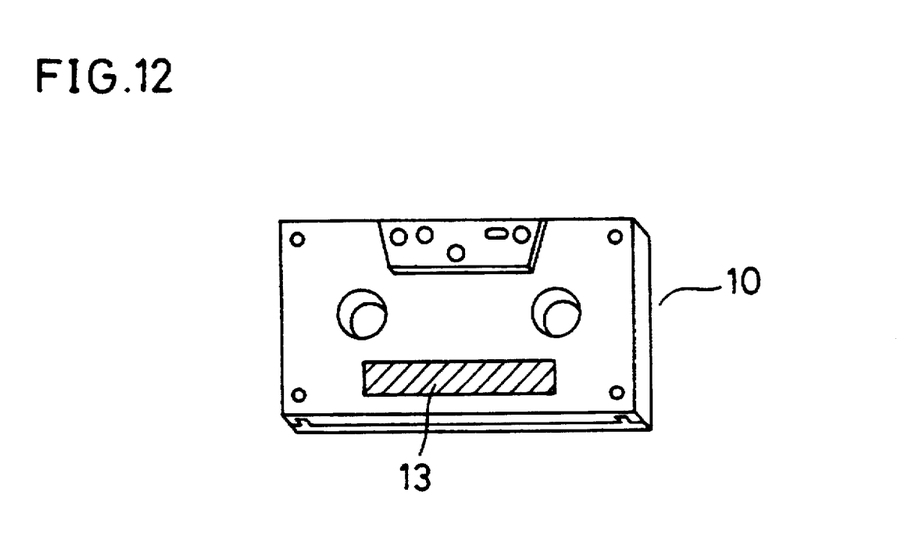
FIG. 12 is a perspective view in which a cassette tape is seen from above.
Figure 13:
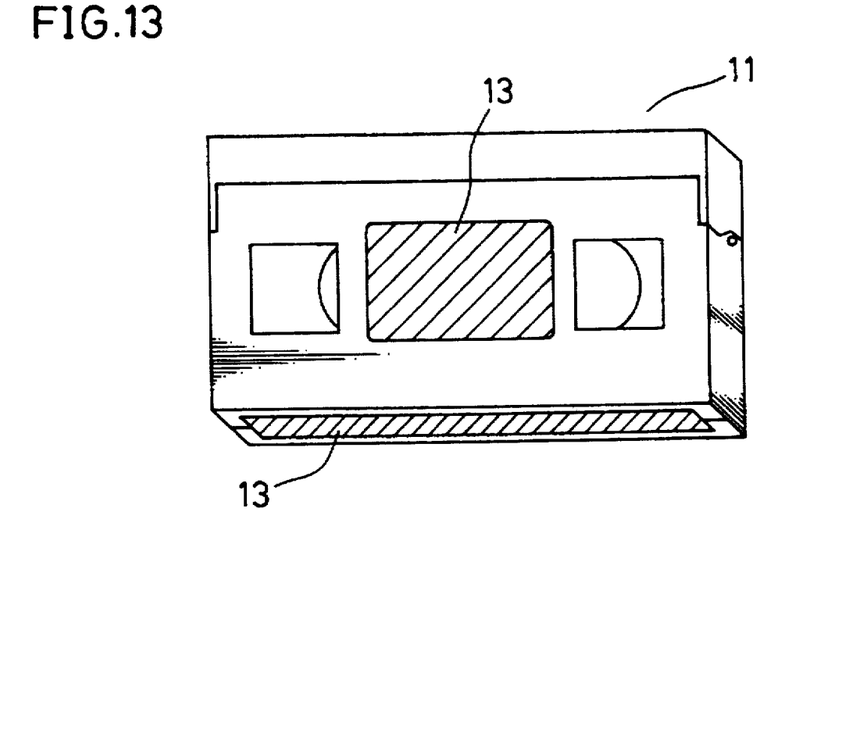
FIG. 13 is a perspective view in which a video tape is seen from above.
Figure 14:
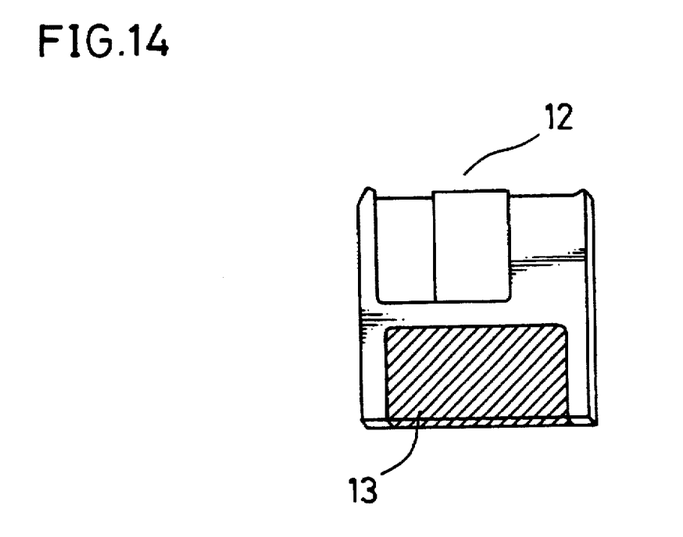
FIG. 14 is a perspective view in which a magneto-optical disk cartridge is seen from above.
Figure 15:
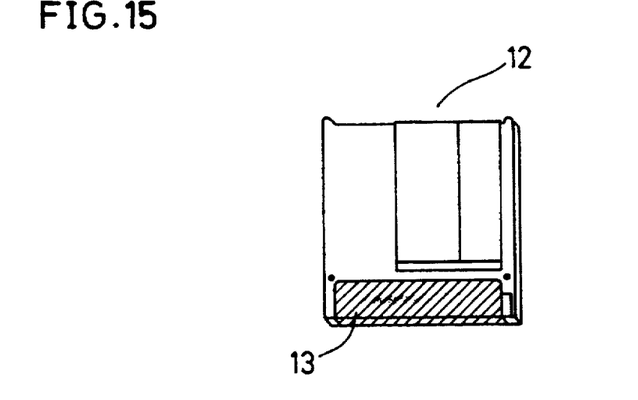
FIG. 15 is a perspective view in which the magneto-optical disk cartridge is seen from below.
Figure 16:
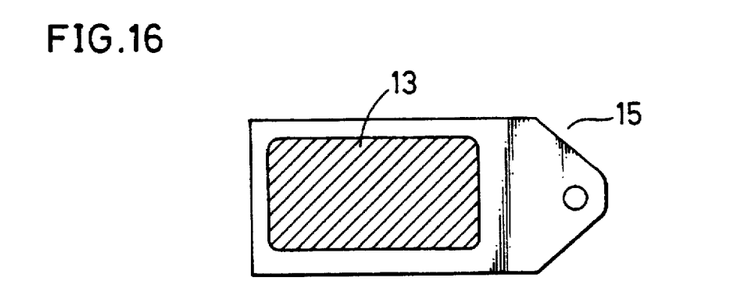
FIG. 16 is a top view of a tag.
Figure 17:
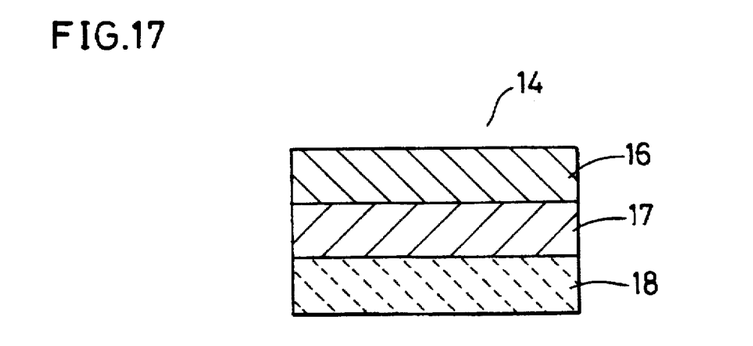
FIG. 17 is a cross-sectional view of an adhesive label.

Conventional label adhesion system will be explained below with reference to the drawings. FIG. 12 and FIG. 13 are perspective views in which a cassette tape 10 and a video tape 11 are seen from the cases above. FIG. 14 and FIG. 15 are perspective views in which a magneto-optical disk cartridge 12 is seen from above and below. FIG. 16 is a top view of a tag. FIG. 17 is a cross-sectional view of an adhesive label. A label region 13 (for example, defined by a shallow level difference) prescribed by a standard is provided on these sound and image recording medium cases and other information recording medium cases in order to identify the recorded contents thereof. An adhesive label 14 (refer to FIG. 17 described later) coated on the back with an adhesive is adhered to this label region 13. As described above, the contents written on the adhesive labels are often rewritten, and rewriting by readhering the adhesive label 14 is also carried out of necessity. The adhesive label 14 is naturally not restricted for the use of information recording media but is also used for various products such as magnetic disk (floppy disk) cartridges, stationary and the tag 15 shown in FIG. 16.

The adhesive label 14 has, for example, the structure shown in FIG. 17. That is, the label is of a three layer structure in which an adhesive material 17 is provided on one side of a label surface substrate 16, and a release paper 18 for protecting the adhesive material is provided on the surface of the adhesive material 17. When being adhered, the release paper 18 for protecting the adhesive material is peeled off and the surface of the adhesive material 17 is adhered to the label region 13.

In general, materials such as a hard synthetic resin are used for the various recording medium cases, stationary and tags described above, molded by injection molding in most cases. In this case, weld lines (lines which are formed when materials flowing separately meet one another) and jetting (a phenomenon in which a material injected from the nozzle of a molding machine runs irregularly and generates a partially undulating flow in a mold) are caused. This is accompanied by inferior brightness and irregular color in many cases. Also, it is very difficult to completely remove scratches generated during production. These inconveniences markedly damage the qualities of products.

Accordingly, in order to make these phenomena inconspicuous when they are generated, grain pattern processing is usually provided on the surfaces of an injection-molded product. This is for providing a mold surface with fine irregular patterns such as sand grain, wooden grain, cloth grain or leather-like texture in producing molds by etching, casting or electric discharge machining, and these irregular patterns are transferred onto the products in injection molding.

This grain pattern processing is provided on the entire surface of products in many cases, and it is often provided as well on the label regions shown in FIG. 12 to FIG. 16. Under such circumstances, the adhesive strength of the adhesive label 14 (refer to FIG. 17) on the label region 13 is impaired. When temperatures increase a float-peeling phenomenon where the adhesive label 14 naturally peels off occurs, and in the worst cases, there have been instances where the peeled adhesive label has wound round a magnetic head in the inside of a player unit and a pick-up in a driving unit, damaging both units. In particular, in the case of magneto-optical disk cartridges, there have been instances where temperatures have increased up to about 50° C. inside of a unit into which the disk has been inserted, and therefore the float-peeling phenomenon described above has been a problem.

On the other hand, smooth surface processing is performed on the label region 13 in some cases without performing grain pattern processing in order to secure the adhesion of the adhesive label 14. This case includes a problem wherein, after sticking, particularly with a lapse of time, the adhesive strength of the adhesive label 14 becomes too strong, and when the adhesive label 14 is peeled off, the surface substrate and the adhesive material 16 on the adhesive label 14 are peeled off and the remaining adhesive material 16 remains on the label region 3, which results in notable damage to product quality.

SUMMARY OF THE INVENTION

Accordingly, one of the objects of the present invention is to provide a label adhesion system, an article having this structure and a structure in which a label is adhered to this article, in which label peeling is not generated in normal use and the adhesive can be prevented from remaining behind when re-adhering, and which has excellent usability and reliability.

In order to achieve the above object, the present invention provides a label adhesion system in which an adhesive label is adhered on an adhesion face of an article, wherein a first adhesion region having strong adhesiveness is provided in at least a part of a peripheral portion within the adhesion face described above, and a second adhesion region excluding the first adhesion region described above is set to have weaker adhesiveness than that of the first adhesion region.

The label adhesion system according to the present invention can be applied to information recording medium cases, stationary and products such as tags. It is preferably applied particularly to sound and image recording medium cases and other information recording medium cases, specifically cassette tapes, video tapes, optical disk cartridges, magneto-optical disk (floppy disk) cartridges, and magnetic disk cartridges.

An adhesion face for an adhesive label to be adhered thereto, prescribed by standards for distinguishing recorded contents, i.e. a label region, is formed on the articles described above, particularly information recording medium cases. In the case of optical and/or magnetic disk cartridges, this label region is provided on an A face (front face), a B face (rear face) and a bottom face of a case independently or spreading entirely over all three faces. Specifically, it is prescribed in detail in the JIS Standards (for example, JIS X6271-1991, JIS X6272-1992 and the like) as "user label region" or "label region" and avoids a head window and an index window. The region described above is preferably shown on the surfaces of articles by, for example, shallow level differences (for example, concavities of minimum 0.2 mm), narrow projecting enclosures, etc.

Thereby, the adhesive label is adhered to the label region described above in a manner whereby it can be peeled off. Specifically, the adhesive label comprises a label surface substrate layer and an adhesive material layer. Wood-free paper having a thickness of 50 to 150 μm and a weight of about 50 g/m² to about 80 g/m² is preferred as the former, and an acrylic series high molecular compound having an adhesive force of about 0.3 to about 1.5 kgf is preferred as the latter.

These adhesive labels are formed in three layers by laminating a release paper for protecting the adhesive material on the adhesive face side of the adhesive material layer, with the release paper for protecting the adhesive material being peeled off immediately before use to adhere the label to the adhesion face of an article.

Glassine paper (for example, 50 to 200 μm) treated with silicon is preferably used as the release paper.

The first adhesive region described above having a strong adhesive strength is preferably formed dispersedly also at an inner portion surrounded by the peripheral part of the adhesion face described above.

The first adhesive region described above is preferably a substantially smooth face, and grain pattern processing is preferably performed on the second adhesive region described above. Alternatively, the above first adhesive region is a grain pattern-processed face having fine surface roughness, and the above second adhesive region may have surface roughness greater than that of the grain pattern-processed face of the above first adhesive region.

Here, "substantially smooth face" means a face which is so smooth and flat that adhering an adhesive label thereon can assure reliable adhesion. Specifically, it is a face having:

$$Rz \leq 0.1 \; \mu m$$

$$Sm \geq 5 \; mm$$

On the other hand, "grain pattern processing" means fine irregular pattern processing such as sand grain, wood grain, cloth grain or leather-like texture. Specifically, the patterns corresponding to the fine irregular patterns described above are formed on a mold surface by etching, casting or electric discharge machining to produce molds, and these patterns are formed by transferring them onto the articles by injection molding.

It is preferable for the first adhesive region described above to be a substantially smooth face and when grain pattern processing is performed on the second adhesive region described above, the surface roughness in the grain pattern processing described above is set to:

$$10.5 \; \mu m \leq Rz \leq 11.8 \; \mu m, \; 0.154 \; mm \leq Sm \leq 0.219 \; mm$$

where Rz is the average roughness at ten points and Sm is the average interval between irregularities.

Further, it is preferable for the above first adhesive region to be a grain pattern-processed face having fine surface roughness and when the above second adhesive region has a surface roughness larger than that of the grain pattern-processed face of the above first adhesive region, the surface roughness in the grain pattern processing of the above first adhesive region is set to:

$$Rz \leq 6.44 \; \mu m, \; Sm \leq 0.110 \; mm$$

where Rz is the average roughness at ten points and Sm is the average interval between irregularities.

When grain pattern processing is performed on the second adhesive region described above, the roughness in this grain pattern processing preferably increases gradually from the outside to the inside.

As described above, since the first adhesive region having a strong adhesiveness is provided in at least a part of a peripheral region within an adhesion face, and the second adhesive region excluding the above first adhesive region is set to an adhesive face having weaker adhesiveness than that of the above first adhesive region, whereby a label is strongly adhered in the peripheral region, a system in which label peeling can be prevented is formed, and the inside region is readily peeled off when re-adhering the label. Accordingly, remaining adhesive can be eliminated or reduced, and the quality of the adhesion face can be prevented from deteriorating.

Even when a label is large and therefore the adhesion area is large, label peeling can be reliably prevented by dispersedly forming the first adhesive region described above having a strong adhesive strength also in the inside region surrounded by the peripheral region of the adhesion face. Also, since not the whole face is strongly adhered remaining adhesive can be reduced as well.

Since if a system is set in which the first adhesive region is a smooth face and grain pattern processing is performed on the second adhesive region described above, the adhesive strength on the smooth face of a label is strong, label peeling can be reliably prevented and adhesive remaining behind can be reduced, even if environmental temperatures rise (for example, even if the temperature at the periphery of a disk rises to about 50° C. in a magneto-optical disk). Here, a suitable specific surface roughness in grain pattern processing is:

$$10.5 \; \mu m \leq Rz \leq 11.8 \; \mu m, \; 0.154 \; mm \leq Sm \leq 0.219 \; mm$$

wherein Rz is the average roughness at ten points and Sm is the average interval between irregularities.

Alternatively, the same effect can also be obtained by setting the above first adhesive region to a grain pattern-processed face having a fine surface roughness and setting the above second adhesive region to a surface roughness larger than that of the grain pattern-processed face of the above first adhesive region. Here, the suitable surface roughness in the grain pattern processing of the first adhesive region is:

$$RZ \leq 10.5 \; \mu m, \; Sm \leq 0.154 \; mm$$

wherein RZ is the average roughness at ten points and Sm is the average interval between irregularities.

Further, label peeling can be prevented and adhesive remaining on a label can be eliminated or decreased by increasing the roughness in this grain pattern processing gradually from the outside to the inside when the grain pattern processing is performed on the second adhesive region described above. Accordingly, the quality of the adhesion face can be prevented from deteriorating. This system can further improve adhesive strength.

DETAILED DESCRIPTION OF THE INVENTION

As described above, the present invention can achieve a label adhesion system in which a label does not peel off during normal use and adhesive remaining behind does not occur when re-adhering, by providing a portion having strong adhesiveness and a portion having weak adhesiveness on an adhesion face on which an adhesive label is adhered.

Figure 1:
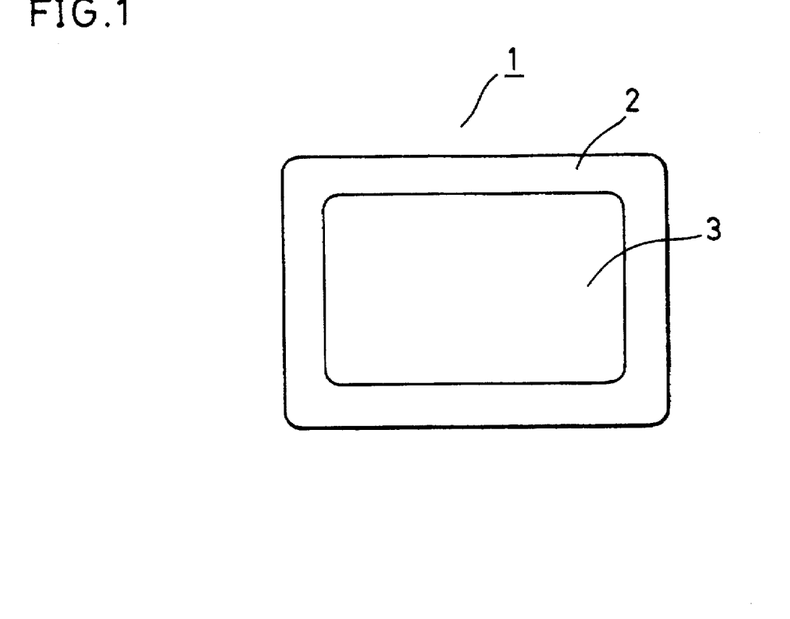
FIG. 1 is a top view showing a label adhesion system according to an embodiment of the present invention.

Descriptions will specifically be given below with reference to the drawings. FIG. 1 is a top view showing the label adhesion system according to one embodiment of the present invention. Here, reference numeral 1 indicates the adhesion face of a product (article), for example a cassette tape prior to adhesion of an adhesive label 14 (refer to FIG. 17).

As shown in FIG. 1, in the adhesion face 1 of a label, a peripheral region 2 constituting the first adhesive region is set to a smooth face, and grain pattern processing is performed on an inner region 3 constituting the second adhesive region which is surrounded by this peripheral region 2. As described above, since the peripheral region 2 is a smooth face, there is no possibility of float-peeling occurring during normal use of the product even if ambient temperatures increase. Even if a grain pattern-processed part in the inside region floats, the whole label will not peel off from the adhesion surface since the label at the outside part is surely adhered.

When re-adhering the label, the inside region 3 can readily be peeled off merely by peeling off part of the peripheral region 2, since only this part has strong adhesiveness. Accordingly, adhesive remaining behind can further be eliminated, or since the adhesive strength can be reduced compared with the adhesive strength in a case where the whole face is a smooth face as was the case in the past, remaining adhesive can be reduced to a large extent.

Here, grain pattern processing roughness in grain pattern processing can be variously set, and the adhesive strength varied according to roughness. Experiments on the relationship of the grain pattern processing roughness to adhesive strength resulted in the data shown in Table 1.

TABLE 1

Figure 2:
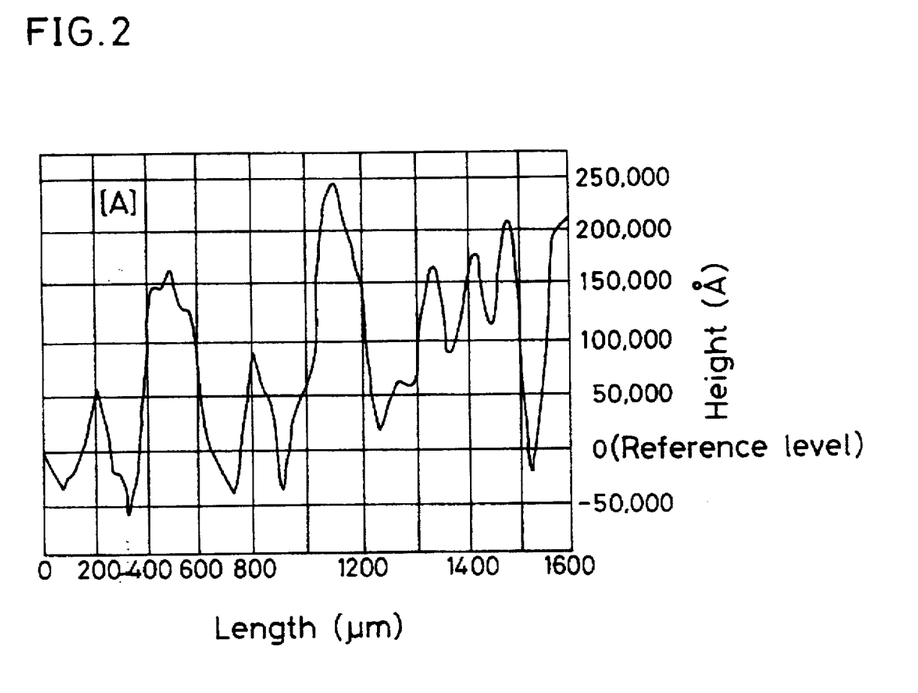
FIG. 2 is a graph showing the result of surface measurement for a label adhesion region (A).
Figure 3:
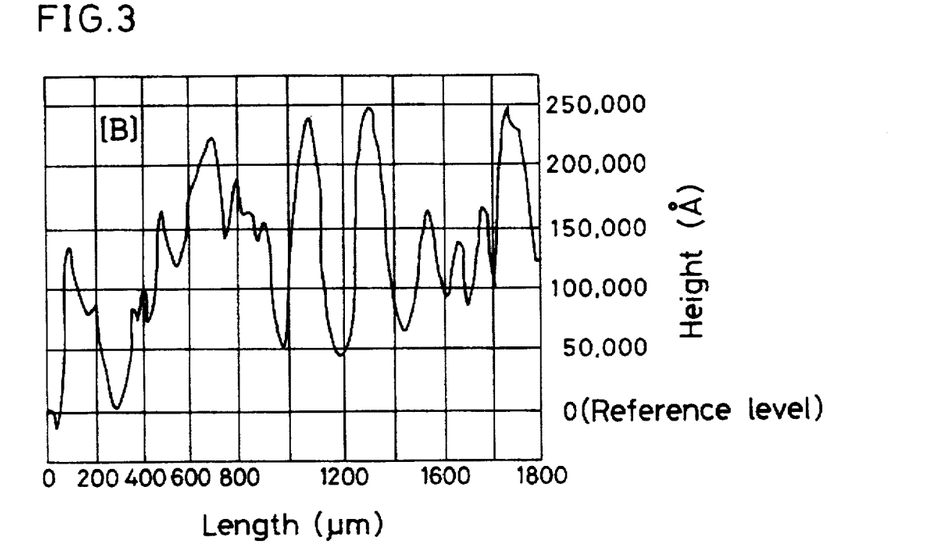
FIG. 3 is a graph showing the result of surface measurement for a label adhesion region (B).
Figure 4:
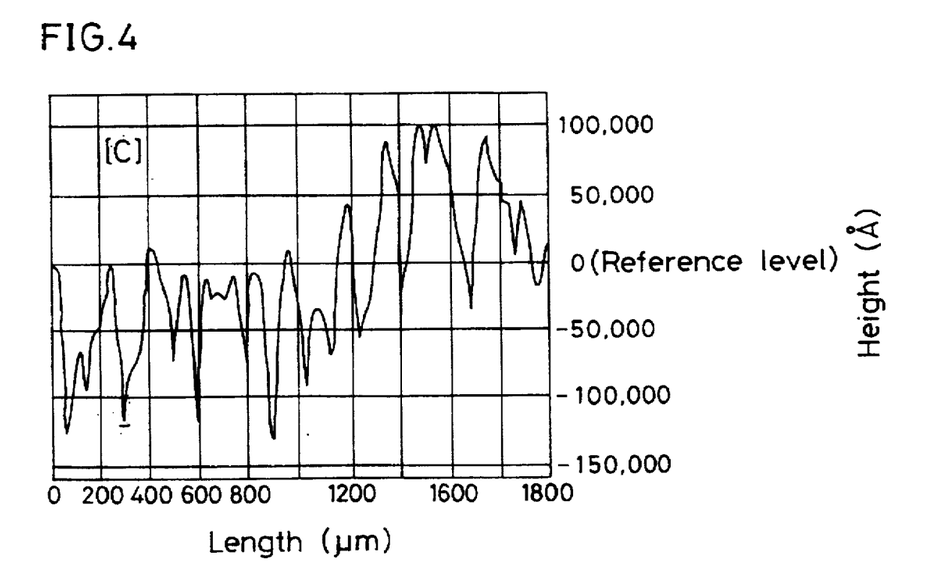
FIG. 4 is a graph showing the result of surface measurement for a label adhesion region (C).
Figure 5:
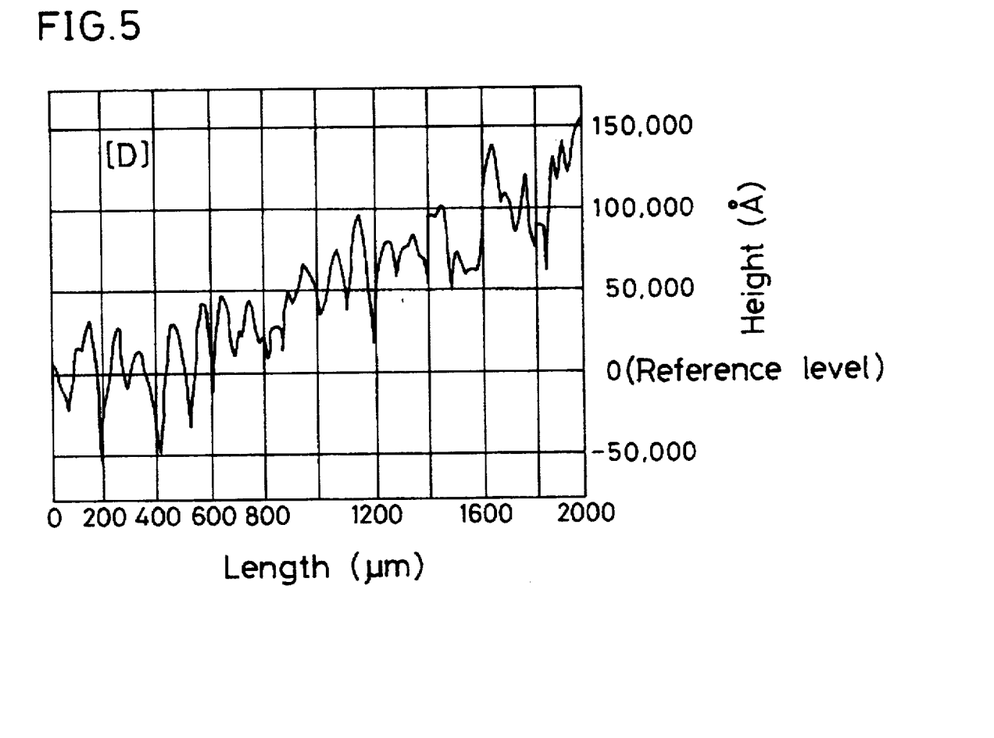
FIG. 5 is a graph showing the result of surface measurement for a label adhesion region (D).
Figure 6:
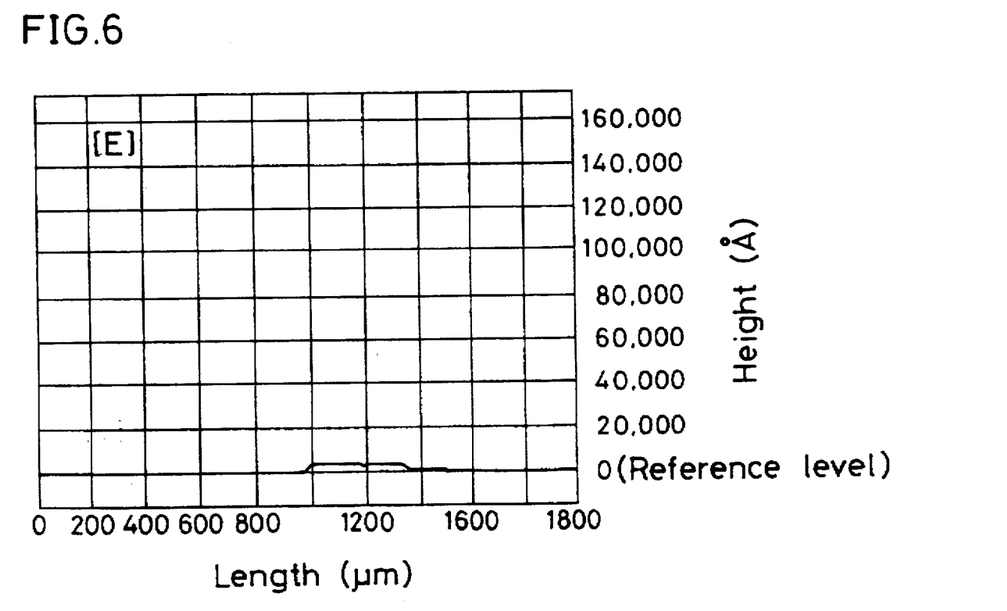
FIG. 6 is a drawing showing the result of surface measurement for a label adhesion region (E).

|  | Roughness | | Adhesive label* | | Adhesive label** | |
|---|---|---|---|---|---|---|
|  | | | Initial | Permanent | Initial | Permanent |
|  | Rz (μm) | Sm (mm) | (kgf) | (kgf) | (kgf) | (kgf) |
| FIG. 2 (A) | 17.6 | 0.300 | 0.460 | 0.600 | 0.300 | 0.300 |
| FIG. 3 (B) | 11.8 | 0.219 | 0.630 | 0.980 | 0.430 | 0.530 |
| FIG. 4 (C) | 10.5 | 0.154 | 0.650 | 0.970 | 0.520 | 0.560 |
| FIG. 5 (D) | 6.44 | 0.110 | 0.760 | 1.050 | 0.630 | 0.810 |
| FIG. 6 (E) | smooth | smooth | 0.910 | 1.100 | 0.730 | 0.900 |

*Preferred Embodiment 1
**Preferred Embodiment 2

Here, Rz is the average roughness at 10 points, and Sm is the average interval between irregularities. In Table 1, the term "Initial" means the adhesive strength immediately after sticking a label, and the term "Permanent" means the adhesive strength after a lapse of 24 hours.

[Preferred Embodiment 1]

Label surface substrate: wood-free paper of 82 μm (weight 68 g/m$^2$)

Adhesive material: acrylic series high molecular compound

Release paper: glassine paper of 100 μm treated with silicon

[Preferred Embodiment 2]

Label surface substrate: wood-free series paper of 82 μm (weight 60 g/m$^2$)

Adhesive material: acrylic series high molecular compound

Release paper: glassine paper of 110 μm treated with silicon

Measurement conditions are as follows:
  Adhesive label width: 25 mm
  Peeling direction: 90°
  Peeling speed: 300 mm/min
  Measurement environment: 20° C./45% RH As is apparent from the results shown in Table 1, it can be found that both the initial adhesive strength and the permanent adhesive strength decrease as grain pattern processing roughness increases. Further, it can be found that adhesive strength increases according to the lapse of time. The results of surface measurement of the concrete label regions each corresponding to the respective roughnesses shown in A to E of Table 1 are shown in FIG. 2 to FIG. 6. FIG. 2 to FIG. 6 show results obtained by scanning the adhesion regions with a detector to observe how irregularities on the surfaces thereof are changed.

The grain pattern processing roughness in the inner region 3 shown in FIG. 1 does not have as strong an adhesiveness as the smooth face and this, combined with levels where the adhesive strength is not too weak, resulted in clarifying that C, i.e. the extent of Rz=10.5 μm and Sm=0.154 mm is suitable. However, it was found that B of Table 1 also does not particularly cause any problems.

The peripheral region 2 is not necessarily limited to a smooth face if it has sufficient adhesive strength and may be a face which is subjected to grain pattern processing. On this occasion, it has been found that a grain pattern-processed face can be the finely processed face of D in Table 1, that is, Rz=6.44 µm or less and Sm=0.110 or less and that the suitable grain pattern progessing roughness in the inner region 3 is C in Table 1 similarly to that described above, that is, Rz=10.5 µm and Sm=0.154 mm.

Figure 7:
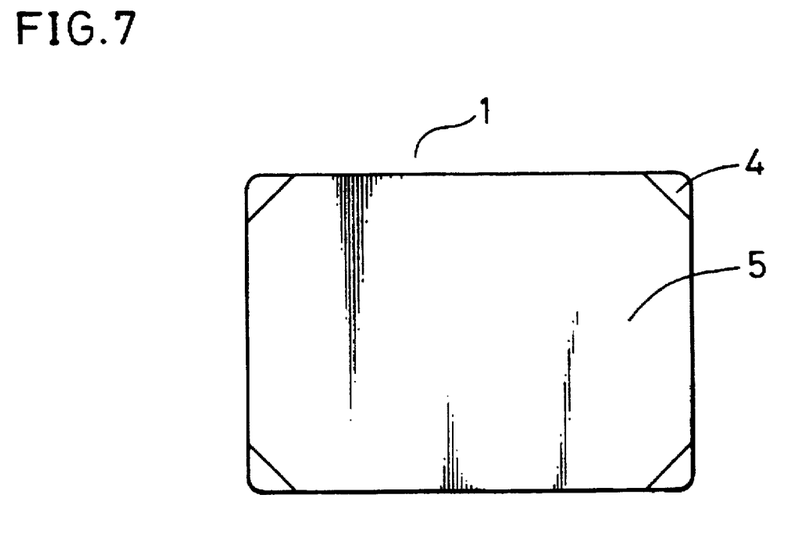
FIG. 7 is a top view showing a label adhesion system according to another embodiment of the present invention.

FIG. 7 shows another preferred embodiment of the present invention. In this preferred embodiment, among the adhesion face 1 of a label, a corner vicinity region 4 constituting the first adhesive region is set as a smooth processing face, and the second adhesive region 5 constituting the other part is set as a grain pattern-processed face. In this case, since the label region 1 is a rectangle, smooth face processing is performed on the four corners thereof. According to the present preferred embodiment, the smooth face having strong adhesiveness is smaller than that in FIG. 1, so that adhesive remaining behind can in turn be decreased. In actual practice, it has been found that remaining adhesive is not generated in this structure.

C or B in Table 1 is suitable for grain pattern processing roughness of a grain pattern processing face similarly to the case of FIG. 1.

Figure 8:
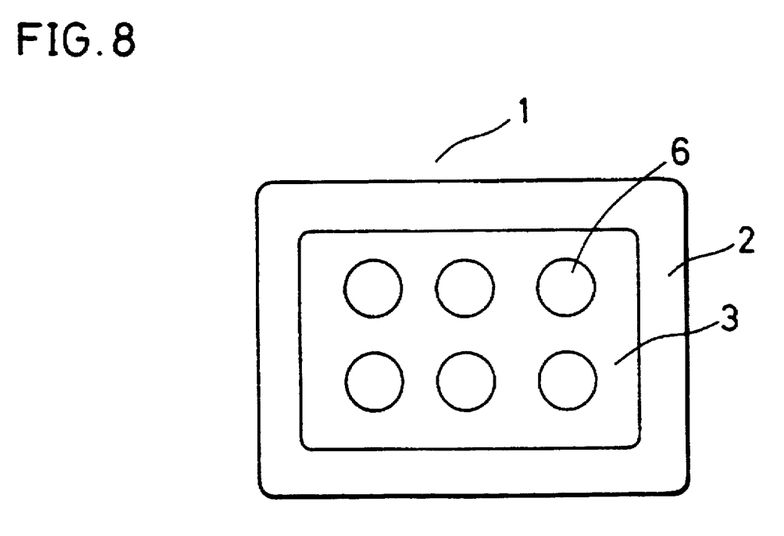
FIG. 8 is a top view showing the label adhesion system according to a further embodiment of the present invention.

FIG. 8 is the application example of the preferred embodiment shown in FIG. 1. It is considered that in the case where an adherence face of a label is relatively large, a little floating is generated in the structure shown in FIG. 1 when the grain pattern processing roughness is large. Accordingly, as shown in FIG. 8, a plurality of smooth face processing regions 6 in the second adhesive region having a strong adhesive strength are formed in the inner region. C or B in Table 1 is suitable for the grain pattern processing for the inner region similarly to the preferred embodiment shown in FIG. 1.

Also, grain pattern processing giving a finer roughness may be provided in place of a smooth face processing region 6. D or C in Table 1 is suitable for the grain pattern processing roughness in this case.

Figure 9:
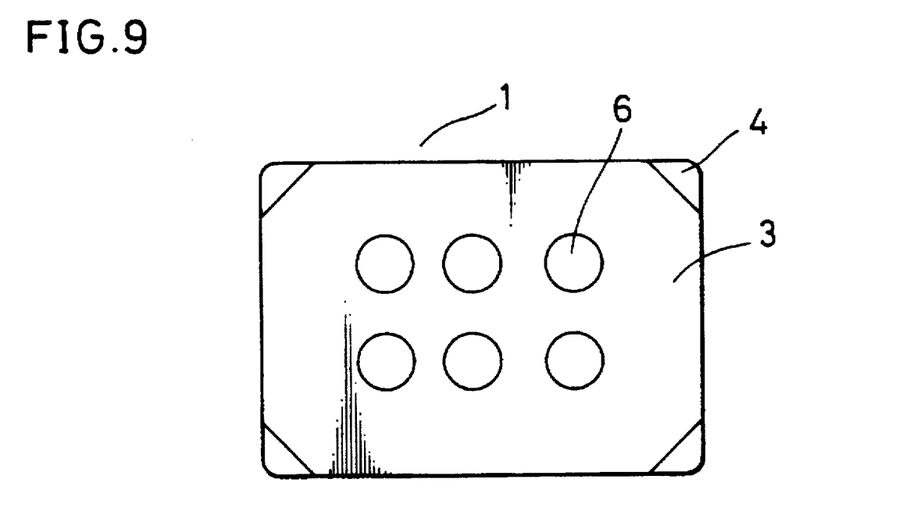
FIG. 9 is a top view showing the label adhesion system according to yet another embodiment of the present invention.

FIG. 9 is the application example of FIG. 8. In this preferred embodiment, a corner vicinity region 4 has been set to a smooth face processing region similarly to the preferred embodiment in FIG. 7. This can further decrease remaining adhesive. The grain pattern processing roughness is the same as that in FIG. 8.

Figure 10:
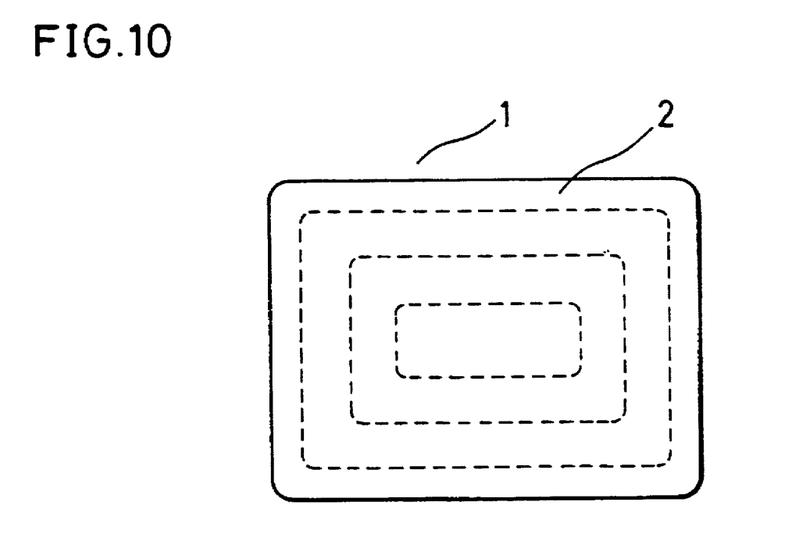
FIG. 10 is a top view showing the label adhesion system according to still another preferred embodiment of the present invention.
Figure 11:
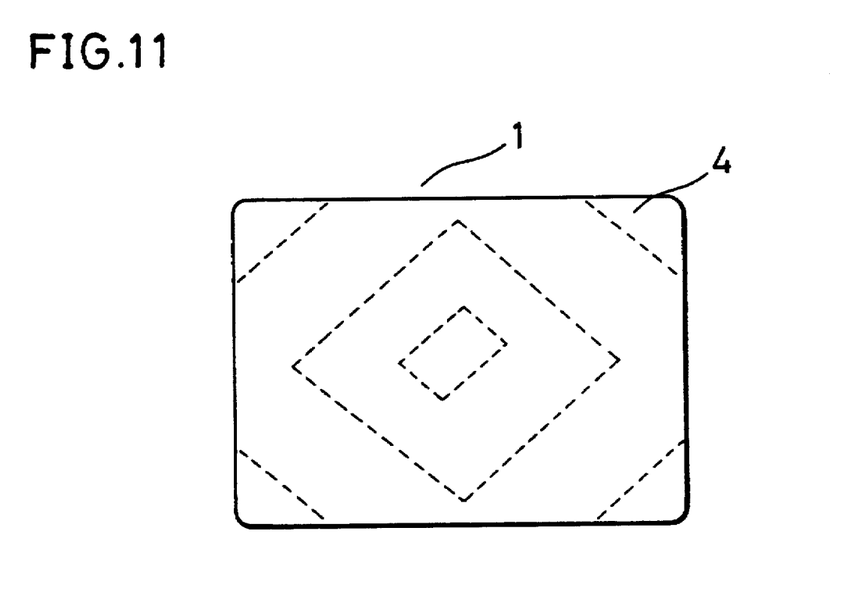
FIG. 11 is a top view showing the label adhesion system according to a still further embodiment of the present invention.

FIG. 10 and FIG. 11 are still other preferred embodiments of the present invention. In both of these preferred embodiments, smooth face processing or grain pattern processing giving finer roughness is performed in the vicinity of a peripheral part 2 on an adhesion face 1 of a label. A structure has been set in which the roughness in grain pattern processing is gradually increased in stages or continuously from this peripheral part 2 toward the inside of the adhesion face 1 of the label. The vicinity of the peripheral part 2 of a label region in the preferred embodiment in FIG. 10 and a corner vicinity region 4 of a label region in the preferred embodiment in FIG. 11 are set to smooth faces or faces having fine grain pattern processing roughnesses.

Also in the present preferred embodiment, a label adhesion system in which label peeling is removed and remaining adhesive is decreased in re-adhesion can be achieved similarly to the preferred embodiment described above. According to the present preferred embodiment, adhesive strength in particular can be improved.

As shown in, for example, FIG. 14 and FIG. 15, a structure in which the label adhesion faces 1 in the respective preferred embodiments described above can be bent three-dimensionally is used in some cases depending on the shapes of products, and if the label regions when reopening them are the structure of the present invention, the effects are exactly the same.

The present invention is not limited to the respective preferred embodiments described above, and other system may be used as long as the characteristics of the present invention are maintained, that is, a smooth face or a fine grain pattern processed face is provided in least a part of a peripheral region in a label region, and the other parts are rough grain pattern processed faces.

As described above, according to the label adhesion system of the present invention, an old problem, that is, the problem that for example a label adhered to a magneto-optical disk is peeled off and becomes entangled in a player unit can be avoided, and high reliability can be ensured.

In addition, peeling of a label while re-adhering does not cause adhesive to remain on an adhesion surface and does not reduce the quality of the adherence surface. The effects corresponding to the respective claims will be shown below.

According to the invention, since a label is strongly adhered to a peripheral region, the system can prevent label peeling, and since the label is readily peeled off in an inner region when removing, adhesive remaining on the label surface can be removed or decreased, and reduction in the quality of the adhesion face can be prevented.

The first adhesion region having strong adhesiveness may be dispersedly formed also at an inner portion arounded by the peripheral part of the adhesion face. This will bring an advantage that label peeling can be prevented even when a label is large and therefore the adhesion area is large. Also, since the label is not strongly adhered to the whole face, remaining adhesive can be reduced as well.

The first adhesion region may be a substantially smooth face, and grain pattern processing may be performed on the second adhesion region. This will bring another advantage that since an adhesive strength to a smooth face of a label is strong, even if ambient temperatures rise (for example, in the case of a magneto-optical disk, even if the ambient temperature of the disk is increased up to about 50° C.), label peeling can be reliably prevented, and remaining adhesive can be reduced. Here, the effects described above can be reliably ensured by setting the concrete surface roughness in grain pattern processing to the following values:

$$10.5 \ \mu m \leq Rz \leq 11.8 \ \mu m, \ 0.154 \ mm \leq Sm \leq 0.219$$

wherein Rz is an average roughness at ten points and Sm is an average interval between irregularities.

The first adhesion region may be a grain pattern-processed face having a fine surface roughness, and said second adhesion region may have a surface roughness larger than that of the grain pattern-processed face of said first adhesion region.

The same effects as those provided by this system can be obtained. The effects described above can be reliably ensured by setting the concrete surface roughness in grain pattern processing of the first adhesive region to the following values:

$$Rz \leq 10.5 \ \mu m, \ Sm \leq 0.154 \ mm$$

wherein Rz is an average roughness at ten points and Sm is an average interval between irregularities.

The roughness in the grain pattern processing of the second adhesive region may be ronghened gradually from outside to inside. This will bring another advantage that label peeling can be prevented, and remaining adhesive on a label can be removed or decreased, which can prevent reduction in the quality of the adhesion face. This structure can further improve adhesive strength.

What is claimed is:

1. A label adhesion system in which an adhesive label having a continuous and substantially uniform layer of adhesive on a surface thereof is adhered to an adhesion face of an article, wherein the adhesion face of the article includes at least a first adhesion region providing strong adhesion between the label and the first adhesion region of at least a peripheral part of the label, and at least a second adhesion region excluding the first adhesion region of the article for providing weaker adhesion between said second region and the label than that of the first adhesion region.

2. The label adhesion system in claim 1, wherein said first adhesion region having strong adhesiveness is formed to further include an inner portion surrounded by the peripheral part of said adhesion face of the article.

3. The label adhesion system in claim 1, wherein said first adhesion region is a substantially smooth surface on said face, and said second adhesion region has a grain pattern textured surface.

4. The label adhesion system in claim 1, wherein said first adhesion region has a grain pattern-processed surface on said face having a fine surface roughness, and said second adhesion region has a surface roughness more coarse than that of the grain pattern-processed surface of said first adhesion region.

5. The label adhesion system in claim 3, wherein a surface roughness in said grain pattern processing is set to:

$$10.5 \; \mu m \leq Rz \leq 11.8 \; \mu m, \; 0.154 \; mm \leq Sm \leq 0.219$$

wherein Rz is an average roughness at ten points and Sm is an average interval between irregularities.

6. The label adhesion system in claim 4, wherein a surface roughness in grain pattern processing of said first adhesive region is set to:

$$Rz \leq 10.5 \; \mu m, \; Sm \leq 0.110 \; mm$$

wherein Rz is an average roughness at ten points and Sm is an average interval between irregularities.

7. The label adhesion system in claim 3, wherein the roughness in the grain pattern processing of said second adhesive region is gradually more coarse from an outside portion to an inside portion.

8. The label adhesion system in claim 1, wherein the article is an information recording medium case for sound, image or both.

9. The label adhesion system in claim 8, wherein the information recording medium case is a cassette tape, a video tape, an optical disk cartridge, a magnetic disk cartridge or a magneto-optical disk cartridge.

10. The label adhesion system in claim 8, wherein the adhesion face of the article is formed on a front face, a rear face and a bottom face.

11. The label adhesion system in claim 10, wherein the adhesion faces formed on the front face, rear face and bottom face are continuous with each other.

12. The label adhesion system in claim 8, wherein the adhesion face of the article is a face having a shallow level difference formed on a case surface.

13. The label adhesion system in claim 1, wherein the adhesive label comprises a label surface material layer and a further material layer capable of being peeled off the adhesive label.

14. The label adhesion system in claim 13, wherein the further material layer is made of an acrylic polymer.

* * * * *